United States Patent Office 3,577,265
Patented May 4, 1971

3,577,265
VINYL RESIN-SILOXANE COATED ARTICLE
John D. Nordstrom, Detroit, Mich., assignor to Ford Motor Company, Dearborn, Mich.
No Drawing. Filed Nov. 18, 1968, Ser. No. 776,781
Int. Cl. B44d 1/50; B41m 7/00
U.S. Cl. 117—93.31
9 Claims

ABSTRACT OF THE DISCLOSURE

A radiation-curable, film-forming paint binder is prepared from an alpha-beta olefinically unsaturated vinyl monomer-comprising binder resin and an alpha-beta olefinically unsaturated siloxane having at least two functional groups selected from hydroxyl groups and hydrocarbonoxy groups with a hydroxyl bearing ester of an alpha-beta olefinically unsaturated carboxylic acid. In a preferred embodiment, the binder solution also contains vinyl monomers. The preferred hydroxyl bearing esters are acrylates and methacrylates. The paint binder is applied as a liquid film to a substrate and cured thereon by an electron beam.

This invention relates to the art of coating and is concerned with paint and painted articles of manufacture wherein the painted surface has high resistance to weathering. This invention is particularly concerned with articles of manufacture having external surfaces of wood, metal or synthetic polymeric solid coated with an in situ formed polymerization product of a radiation-curable paint binder crosslinked on said surface by ionizing radiation and comprising a film-forming solution of an alpha-beta olefinically unsaturated vinyl monomer-comprising binder resin and an alpha-beta olefinically unsaturated polysiloxane, the reaction product of one molar part siloxane having at least two hydroxyl and/or hydrocarbonoxy groups and, preferably at least two molar parts of, a hydroxyl bearing ester of an alpha-beta unsaturated carboxylic acid. In a preferred embodiment, the film-forming solution also contains vinyl monomers.

In this application, the term "paint" is meant to include pigment and/or finely ground filler, the binder without pigment and/or filler or having very little of the same, which can be tinted if desired. Thus, the binder which is ultimately converted to a durable film resistant to weathering, can be all or virtually all that is used to form the film, or it can be a vehicle for pigment and/or particulate filler material.

The siloxanes employed in the preparation of the binder have a reactive hydroxyl or hydrocarbonoxy group bonded to at least two of its silicon atoms. The term "siloxane" as employed herein refers to a compound containing a $$-\overset{|}{\underset{|}{\text{Si}}}-\text{O}-\overset{|}{\underset{|}{\text{Si}}}- \text{ or } -\overset{|}{\underset{|}{\text{C}}}-\text{O}-\overset{|}{\underset{|}{\text{Si}}}-$$

linkage, with the remaining valences being satisfied by a hydrocarbon radical, a hydrocarbonoxy group, hydrogen, a hydroxyl group, or an oxygen atom which interconnects the silicon atom providing such valence with another silicon atom.

The acyclic siloxane molecules which can be used in preparing the paint binder resins in this invention advantageously contain about 3 to about 18 silicon atoms per molecule with corresponding oxygen linkages. The preferred siloxanes are represented by the following general formula:

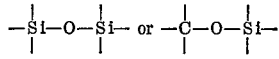

wherein $n$ is at least 1 and X is (a) a $C_1$ to $C_8$ monovalent hydrocarbon radical, preferably a $C_1$ to $C_4$ alkyl radical, or (b) $C_1$ to $C_8$ monovalent hydrocarbonoxy radical, preferably a $C_1$ to $C_4$ alkoxy radical, or (c) a hydroxyl radical, or (d) hydrogen, with at least two of the X groups separated by a

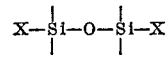

linkage being either (b) or (c).

The cyclic siloxanes which can be used in preparing the paint binder resins of this invention contain at least 3, preferably 6 to 12, and ordinarily not more than 18, silicon atoms per molecule with corresponding oxygen linkages. The cyclic polysiloxanes used may take the form of one of the following type formulas:

(I) $\qquad X_{n'}Si_nO_{n''}$ where $n$=an odd numbered positive integer of at least 3,
$n'=2n$, and
$n''=n$
X=(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

linkage being either (b) or (c)

Exemplified by the following formula:

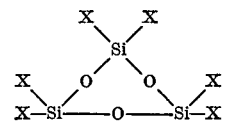

(II) $\qquad X_{n'}Si_nO_{n''}$ where $n$=an odd numbered positive integer of at least 5,
$n'=n+3$, and
$n''=6$, 6+3 or 6+a multiple of 3
X=(a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

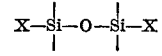

linkage being either (b) or (c)

Exemplified by the following structural formula:

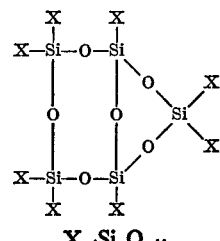

(III) $\qquad X_{n'}Si_nO_{n''}$ where
$n=6$ or a multiple of 6,
$n'=8$, $8+6$, or $8+$a multiple of 6
$n''=8$, $8+9$, or $8+$a multiple of 9
X=(a) a $C_1$ to $C_8$ monovalent hydrocarbon radical, preferably a $C_1$ to $C_4$ alkyl radical, or
 (b) a $C_1$ to $C_8$ monovalent hydrocarbonoxy radical, preferably a $C_1$ to $C_4$ alkoxy radical, or
 (c) a hydroxyl radical, or
 (d) hydrogen—with at least two of the X groups separated by a

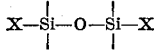

linkage being either (b) or (c)
Exemplified by the following structural formula:

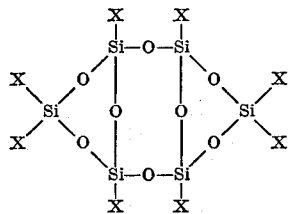

or a condensation dimer, trimer, etc., thereof formed with loss of water or alcohol.

(IV)    $X_{n'}Si_nO_{n''}$ where
$n=$an even numbered positive integer of at least 4,
$n'=n+4$, and
$n''=4$, $4+3$, or $4+$a multiple of 3
X=(a) a $C_1$ to $C_8$ monovalent hydrocarbon radical, preferably a $C_1$ to $C_4$ alkyl radical, or
 (b) a $C_1$ to $C_8$ monovalent hydrocarbonoxy radical, preferably a $C_1$ to $C_4$ alkoxy radical, or
 (c) a hydroxyl radical, or
 (d) hydrogen—with at least two of the X groups separated by a

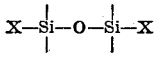

linkage being either (b) or (c)
Exemplified by the following structural formula:

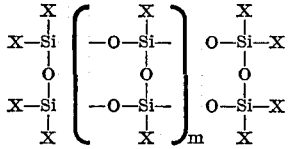

where $m$ is 0 or a positive integer.

(V)    $X_{n'}Si_nO_{n''}$ where
$n=$an even numbered positive integer of at least 8,
$n'=n+2$, and
$n''=11$, $11+3$, or $11+$a multiple of 3
X=(a) a $C_1$ to $C_8$ monovalent hydrocarbon radical, preferably a $C_1$ to $C_4$ alkyl radical, or
 (b) a $C_1$ to $C_8$ monovalent hydrocarbonoxy radical, preferably a $C_1$ to $C_4$ alkoxy radical, or
 (c) a hydroxyl radical, or
 (d) hydrogen—with at least two of the X groups separated by a

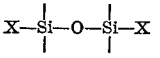

linkage being either (b) or (c)

Exemplified by the following structural formula:

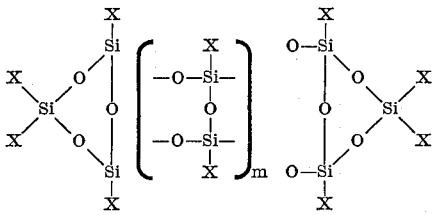

where $m$ is a positive integer.

A variety of methods are known to the art for preparing siloxanes. These include controlled hydrolysis of silanes, polymerization of a lower molecular weight siloxane, reacting silicon tetrachloride with an alcohol, etc. The preparation of siloxanes and their incorporation into organic resins is disclosed in U.S. Pats. 3,154,597; 3,074,904; 3,044,980; 3,044,979; 3,015,637; 2,996,479; 2,973,287; 2,937,230; and 2,909,549.

The hydroxyl bearing ester is preferably a monohydroxy alkyl ester of an alpha-beta olefinically unsaturated monocarboxylic acid. The preferred hydroxy esters are acrylates and methacrylates in that they provide olefinic unsaturation between the terminal carbon atoms and are readily polymerizable at relatively low doses of ionizing radiation. A partial and exemplary list of such acrylates follows:

2-hydroxyethyl acrylate or methacrylate
2-hydroxypropyl acrylate or methacrylate
2-hydroxybutyl acrylate or methacrylate
2-hydroxyoctyl acrylate or methacrylate
2-hydroxydodecanyl acrylate or methacrylate
2-hydroxy-3-chloropropyl acrylate or methacrylate
2-hydroxy-3-acryloxypropyl acrylate or methacrylate
2-hydroxy-3-methacryloxypropyl acrylate or methacrylate
2-hydroxy-3-allyloxypropyl acrylate or methacrylate
2-hydroxy-3-cinnamylpropyl acrylate or methacrylate
2-hydroxy-3-phenoxypropyl acrylate or methacrylate
2-hydroxy-3-(o-chlorophenoxy)propyl acrylate or methacrylate
2-hydroxy-3-(p-chlorophenoxy)propyl acrylate or methacrylate
2 - hydroxy - 3 - (2,4-dichlorophenoxy)propyl acrylate or methacrylate
2-hydroxy-3-acetoxypropyl acrylate or methacrylate
2-hydroxy-3-propionoxypropyl acrylate or methacrylate
2-hydroxy-3-chloroacetoxypropyl acrylate or methacrylate
2-hydroxy-3-dichloroacetoxypropyl acrylate or methacrylate
2-hydroxy-3-trichloroacetoxypropyl acrylate or methacrylate
2-hydroxy-3-benzoxypropyl acrylate or methacrylate
2-hydroxy-3-(o-chlorobenzoxy)propyl acrylate or methacrylate
2-hydroxy-3-(p-chlorobenzoxy)propyl acrylate or methacrylate
2 - hydroxy - 3 - (2,4-dichlorobenzoxy)propyl acrylate or methacrylate
2 - hydroxy - 3 - (3,4-dichlorobenzoxy)propyl acrylate or methacrylate
2 - hydroxy-3-(2,4,6-trichlorophenoxy)propyl acrylate or methacrylate
2 - hydroxy-3-(2,4,5-trichlorophenoxy)propyl acrylate or methacrylate
2-hydroxy-3-(o-chlorophenoxyacetoxy)propyl acrylate or methacrylate
2-hydroxy-3-phenoxyacetoxypropyl acrylate or methacrylate
2-hydroxy-3-(p-chlorophenoxyacetoxy)propyl acrylate or methacrylate
2-hydroxy - 3 - (2,4-dichlorophenoxyacetoxy)acrylate or methacrylate
2-hydroxy-3-(2,4,5-trichlorophenoxyacetoxy)propyl acrylate or methacrylate 2-hydroxy-3-crotonoxypropyl acrylate or methacrylate
2-hydroxy-3-cinnamyloxypropyl acrylate or methacrylate
3-acryloxy-2-hydroxypropyl acrylate or methacrylate
3-allyloxy-2-hydroxypropyl acrylate or methacrylate
3-chloro-2-hydroxypropyl acrylate or methacrylate
3-crotonoxy-2-hydroxypropyl acrylate or methacrylate In addition to acrylates and methacrylates one may also use cinnamates, crotonates, etc.

The term "ionizing radiation" as employed herein means radiation having sufficient energy to effect polymerization of the paint films herein disclosed, i.e. energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece where the intervening space is occupied by air. Adjustment can be made for the relative resistance of the intervening gas which is preferably an oxygen-free inert gas such as nitrogen or helium. I prefer to employ an electron beam which at its source of emission has average energy in the range of about 150,000 to about 500,000 electron volts.

The films formed from the paints of this invention are advantageously cured at relatively low temperatures, e.g. between room temperature (20° to 25° C.) and the temperature at which significant vaporization of its most volatile component is initiated, ordinarily between 20° and 70° C. The radiation energy is applied at dose rates of about 0.1 to about 100 Mrad per second upon a preferably moving workpiece with the coating receiving a total dose in the range of about 0.5 to about 100, ordinarily between about 1 and about 25, and most commonly between 5 and 15 Mrad. The films can be converted by the electron beam into tenaciously bound, wear and weather resistant coatings.

The abbreviation "Mrad" as employed herein means 1,000,000 rad. The term "rad" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ inch in diameter at this point, is then scanned to make a fan-shaped beam and then passed through a metal window, e.g. a magnesium-thorium alloy, aluminum, an alloy of aluminum and a minor amount of copper, etc., of about 0.003 inch thickness.

The term "vinyl monomers" as used herein refers to a monomeric compound having a

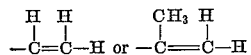

terminal group and excludes allylic compounds. The preferred vinyl monomers are esters of $C_1$ to $C_8$ monohydric alcohols and acrylic or methacrylic acid, e.g. ethyl acrylate, ethyl methacrylate, butyl acrylate, butyl methacrylate, octyl acrylate, 2-ethyl hexyl acrylate, etc. Alcohols of higher carbon number, e.g. $C_9$–$C_{15}$, can also be used to prepare such acrylates and methacrylates. Vinyl hydrocarbon monomers, e.g. styrene and alkylated styrenes such as vinyl toluene, alpha-methyl styrene, etc., may be used separately or in combination with acrylates and methacrylates. Also in combination with acrylates and methacrylates and/or vinyl hydrocarbon monomers, there may be used minor amounts of other vinyl monomers such as nitriles, e.g. acrylonitrile, acrylamide, N-methylol acrylonitrile, vinyl halides, e.g. vinyl chloride, and vinyl carboxylates, e.g. vinyl acetate.

The alpha-beta olefinically unsaturated vinyl monomer comprising binder resins have a molecular weight above about 1,000 and below about 50,000, more commonly below about 25,000. In a preferred embodiment, such resins have a molecular weight in the range of about 3,000 to about 10,000. The vinyl monomer resins advantageously have about 0.5 to about 5, preferably about 1 to about 3.5, units of alpha-beta olefinic unsaturation per 1,000 units molecular weight and can be prepared by a variety of methods.

In one embodiment, the vinyl monomer-comprising binder resin is the copolymerization product of a minor proportion of glycidyl methacrylate and a major proportion of at least two vinyl monomers preferably selected from the group consisting of styrene, esters of acrylic acid, and esters of methacrylic acid which is subsequently reacted with acrylic or methacrylic acid. Other vinyl hydrocarbons, e.g. alpha-methyl styrene, vinyl toluene, etc., may be substituted for the styrene. The initial copolymer may also contain minor amounts of acrylic acid and/or methacrylic acid.

In a second embodiment, the vinyl monomer-comprising binder resin is formed by reacting an unsaturated glycidyl ether with two or more different vinyl monomers and reacting the resultant polymer with an allylic alcohol.

In a third embodiment, the vinyl monomer-comprising binder resin is formed by reacting an allylic alcohol with two or more different vinyl monomers and reacting the resultant polymer with an allylic glycidyl ether.

The allylic alcohol used in the second and third embodiments is ordinarily a $C_3$ to $C_{10}$ allylic alcohol, e.g. allyl alcohol, 2-methyl-2-propen-1-ol, cinnamyl alcohol (3-phenyl-2-propen-1-ol), 2-phenyl-2-propen-1-ol, etc. The aforementioned alcohols may have alkyl substitution with resultant increase in the number of carbon atoms per molecule to as high as about 14.

The allylic glycidyl ethers used in the preparation of the aforesaid copolymer are ordinarily a $C_6$ to $C_{13}$ glycidyl ether but will contain 17 carbon atoms where the ether is formed from a $C_{14}$ alcohol and epichlorohydrin. These include such compounds as allyl glycidyl ether, 1-butene glycidyl ether and glycidyl ethers formed from the aforementioned allylic alcohols. Such ethers can be prepared by the well known reaction of such alcohols with epichlorohydrin or by the Williamson Synthesis.

In a fourth embodiment, the vinyl monomer comprising binder resin is a copolymer of two or more vinyl monomers, including at least one hydroxyl bearing constituent monomer, which has been reacted with an acyl halide.

In a fifth embodiment, the vinyl monomer comprising binder resin is formed by reacting a styrene-allyl alcohol copolymer with methacrylyl chloride or acrylyl chloride.

In a sixth embodiment, the vinyl monomer comprising, binder resin is formed by reacting a partially hydrolyzed polyvinylacetate, styrene-vinyl acetate copolymer, or ethylene-vinyl acetate copolymer with methacrylyl chloride or acrylyl chloride.

It will be seen that in the aforedescribed embodiments, the vinyl monomer-comprising binder resin has a backbone or principal carbon-to-carbon chain consisting essentially of vinyl monomers with side chains having terminal unsaturation. This olefinic unsaturation between the terminal carbons of the side chains is separated from the principal carbon-to-carbon chain by at least one ester linkage or ether linkage.

The film-forming material should have an application viscosity low enough to permit rapid application to the substrate in substantially even depth and high enough so that at least 1 mil (.001 inch) film will hold upon a vertical surface without sagging. Such films will ordinarily be applied to an average depth of about 0.1 to 4 mils with appropriate adjustment in viscosity and application technique. It will be obvious to those skilled in the art that the choice of siloxane and of hydroxy esters in preparing the alpha-beta olefinically unsaturated siloxane component of the binder solution can be varied so as to vary the viscosity of the siloxane component. The molecular weight of the vinyl binder resin may also be varied to control the viscosity of the binder solution. Also, the type and quantity of vinyl monomers in the binder solution are easily adjusted to provide a proper consistency for application by conventional paint application techniques, e.g. spraying, roll coating, etc. It is also within the scope of this invention to employ the vinyl copolymer and the siloxane-unsaturated resin product as the sole polymerizable materials in the binder. Where necessary for application viscosity a volatile solvent can be added and flashed off prior to curing.

Where the binder consists essentially of the alpha-beta olefinically unsaturated vinyl monomer comprising binder resin and the alpha-beta olefinically unsaturated polysiloxane, the binder contains about 20 to about 80, advantageously about 30 to about 70, parts by weight of the vinyl binder resin and about 20 to about 80, advantageously about 30 to about 80, parts by weight of the siloxane.

Where the binder contains significant amounts of vinyl monomers, the binder will advantageously contain about 10 to about 200, preferably about 20 to about 100, parts by weight vinyl monomers, about 20 to 80, preferably about 30 to 70, parts by weight of the vinyl resin and about 20 to 80, preferably about 30 to about 70, parts by weight of the alpha-beta olefinically unsaturated siloxane. Minor amounts of other polymerizable monomers, e.g. allylic compounds, may be used to make up the balance, if any. This invention is particularly concerned with those coatings wherein the film-forming solution, exclusive of vinyl monomers, consists essentially of the vinyl monomer-comprising binder resin and the siloxane-unsaturated ester product, herein defined to mean coating compositions wherein these components constitute at least 85 wt. percent of the film-forming binder.

This invention will be more fully understood from the following illustrative examples:

EXAMPLE 1

A siloxane-unsaturated ester and vinyl monomer-comprising paint is prepared from the following components in the manner hereinafter set forth:

(a) Preparation of the siloxane component:

| Starting materials: | Parts by weight |
|---|---|
| Methoxy functional acyclic siloxane[1] | 178 |
| Hydroxyethyl methacrylate | 118 |
| Tetraisopropyl titanate | 0.32 |
| Hydroquinone | 0.06 |

[1] A commercially available methoxylated partial hydrolysate of monophenyl and phenylmethyl silanes (largely condensed dimethyltriphenyltrimethoxysiloxane) and has the following typical properties:

| Average molecular weight | 750–850 |
|---|---|
| Average number of silicon atoms per molecule | 5–6 |
| Average number of methoxy groups per molecule | 3–4 |

The siloxane, the methacrylate monomer and hydroquinone polymerization inhibitor are heated to 100° C. in a flask fitted with a Barrett type distillation receiver. The titanate catalyst is added and the temperature is raised to 150° C. over a three hour period during which time methanol is removed by distillation. The cooled reaction product has a viscosity of 0.6 stoke at 25° C.

(b) Preparation of the vinyl monomer-comprising binder resin:

| Starting materials: | Parts by weight |
|---|---|
| Xylene | 600 |
| Methyl methacrylate | 196 |
| Ethyl acrylate | 333 |
| Glycidyl methacrylate | 71 |
| Azobisiso butyronitrile | 6 |
| Hydroquinone | 0.12 |
| Methacrylic acid | 42 |
| Triethyl amine | 0.96 |

Procedure

The reaction solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, nitrogen is bubbled through the solution during heat up and throughout the reaction. The combined monomers, excepting the methacrylic acid, and initiator (azobisiso butyronitrile) are added to the refluxing solution evenly over a two-hour period. The initiator weight is 10 parts by weight per 1,000 parts by weight of vinyl monomers. The reaction solution is refluxed until the conversion of monomer to polymer is greater than 97 percent (8–16 hours).

In the second step, hydroquinone is added as an inhibitor and then methacrylic acid is added to react with the residual epoxy groups on the polymer. Triethyl amine is used as a catalyst. This esterification reaction is caried out at reflux temperatures until 80 percent esterification is accomplished (determined by residual acid number). The xylene is then removed by vacuum distillation and the polymer disolved in methyl methacrylate so that the weight ratio of polymer to solvent is two.

(c) Preparation of the paint:

| Components: | Parts by weight |
|---|---|
| Siloxane-ester product of (a) above | 10 |
| Acrylic resin of (b) above | 15 |
| Methyl methacrylate | 2.5 |

The paint is applied to a steel substrate with a #30 wire wound rod and cured to a hard film using the following irradiation conditions:

Electron beam potential: 270 kv.
Electron beam current: 25 ma.
Dose: 15 Mrad
Atmosphere: nitrogen
Distance, workpiece to emitter: 10 inches

EXAMPLE 2

The procedure of Example 1 is repeated except that the vinyl monomer-comprising polymer is prepared from the following ingredients in the following manner:

| | Parts by weight |
|---|---|
| Ethyl acrylate | 38.8 |
| Methyl methacrylate | 23.2 |
| Allyl glycidyl ether | 37.0 |
| Benzoyl Peroxide | 1.0 |
| Xylene | Solvent |

To a reaction vessel provided with a condenser, thermometer, agitator, and dropping funnel there are charged an amount of xylene equal in weight to the reactants to be added in the first reaction step. The xylene is heated to about 100°–120° C. The four reactants are thoroughly mixed and added slowly with a dropping funnel to the heated xylene over a period of four hours. The reaction is held at this temperature for 1–2 hours after addition is complete and then allowed to cool to room temperature.

A binder polymer is formed in a second reaction step from the following materials:

| | Parts by weight |
|---|---|
| Copolymer from Step I | 69.4 |
| Allyl alcohol | 30.4 |
| Potassium hydroxide | 0.2 |

A solution of the allyl-alcohol and potassium hydroxide is added to the copolymer at room temperature. The mixture is then heated to a temperature of 100°–120° C. This temperature is maintained for about 7 hours and allowed to cool. The binder polymer reaction mixture is heated to about 60° C. and the xylene and excess reactant are removed by vacuum distillation.

At a temperature of about 60° C. styrene and hydroquinone are added to the polymer to form a film-forming solution having the following composition:

| | Parts by weight |
|---|---|
| Polymer from Step II | 66.66 |
| Styrene | 33.27 |
| Hydroquinone | 0.07 |

EXAMPLE 3

The procedure of Example 1 is repeated except that the vinyl monomer-comprising polymer is prepared from the following ingredients in the following manner:

| | Parts by weight |
|---|---|
| Ethyl acrylate | 39 |
| Methyl methacrylate | 24 |
| Allyl alcohol | 36 |
| Benzoyl peroxide | 1 |
| Xylene | Solvent |

To a reaction vessel provided with a condenser, thermometer, agitator, and dropping funnel there are charged an amount of xylene equal in weight to the reactants to be added in the first reaction step. The xylene is heated to 100°–120° C. The four reacting materials are thoroughly mixed and added slowly with a dropping funnel to the heated xylene over a period of four hours. The reaction is held at this temperature for 1–2 hours after addition is complete and then allowed to cool to room temperature.

A binder polymer is formed in a second reaction step from the following materials:

| | Parts by weight |
|---|---|
| Copolymer from Step I | 69 |
| Allyl glycidyl ether | 30.8 |
| Potassium hydroxide | 0.2 |

A solution of the allyl glycidyl ether and potassium hydroxide is added to the copolymer at room temperature. The mixture is then heated to a temperature of 100°–120° C. This temperature is maintained for about 7 hours and allowed to cool. The binder polymer reaction mixture is heated to about 60° C. and the xylene and excess reactant are removed by vacuum distillation.

At a temperature of about 60° C. styrene and hydroquinone are added to the polymer to form a film-forming solution having the following composition:

| | Parts by weight |
|---|---|
| Polymer from Step II | 67 |
| Styrene | 32.93 |
| Hydroquinone | 0.07 |

EXAMPLE 4

The procedure of Example 1 is repeated except that the vinyl monomer-comprising polymer is prepared from the following ingredients in the following manner:

Step I

| Reactants: | Parts by weight |
|---|---|
| Methyl methacrylate | 400 |
| Ethyl acrylate | 400 |
| Hydroxy ethyl methacrylate | 195 |
| Toluene | 1000 |
| Benzoyl peroxide | 30 |

The benzoyl peroxide is dissolved in a solution of the methyl methacrylate, ethyl acrylate, and hydroxyethyl methacrylate and one-half of the toluene. This solution is added incrementally to the remainder of the toluene at reflux over a seven-hour period with a final pot temperature of about 138°–140° C. Reflux is maintained for another three hours and the solution cooled.

Step II

| Reactants: | Parts by weight |
|---|---|
| Solution from Step I | 500 |
| Acrylyl chloride | 33.8 |
| Toluene | 30 |

The solution from Step I is heated to 60° C. and a solution of the acrylyl chloride and toluene are added dropwise over a four hour period while the temperature is allowed to rise to about 90° C. After heating for another 2.5 hours, conventional infrared analysis of the solution reveals about 14% residual solution is recovered having a Gardner Holdt viscosity of B–C. This solution is subjected to vacuum below 10 mm. Hg at 70° C. and the acrylic polymer is recovered.

EXAMPLE 5

The procedure of Example 1 is repeated except that the vinyl monomer-comprising polymer is prepared from the following ingredients in the following manner:

An electron-polymerizable paint is prepared from the following materials in the manner hereinafter set forth: 100 parts by weight of a styrene-allyl alcohol copolymer containing 21.4 weight percent allyl alcohol and having an average molecular weight of about 1,620 and 0.1 part by weight hydroquinone are dissolved in toluene and heated to 90° C. and 41.8 parts by weight of methacrylyl chloride in toluene added dropwise over a one-hour period. Heating is continued and the temperature allowed to rise to toluene reflux until essentially complete cessation of gas liberation is obtained after an additional five hours. Infrared analysis shows about 10% residual hydroxyl. The solvent is removed at the water pump.

EXAMPLE 6

The procedure of Example 1 is repeated except that the vinyl monomer-comprising polymer is prepared from the following ingredients in the following manner:

Two hundred and fifty parts by weight of a 25% nonvolatiles solution of solution polymerized polyvinylacetate supplied in a blend of about 85% toluene and 15% methanol are placed in a 1 liter flask equipped for distillation, agitation and dropwise solvent addition. The polyvinylacetate is hydrolyzed to contain about 3.5% hydroxyl. Methanol is removed as the toluene azeotrope and additional toluene added to maintain volume. After completion of methanol removal, the solution is maintained at reflux and 16 parts by weight of methacrylyl chloride in 20 parts by weight of dry dioxane added dropwise over one-half hour. Heating is continued for an additional four hours. Toluene is added during distillation and the excess acid chloride and excess toluene are removed at the water pump. The resultant resin is recovered.

EXAMPLE 7

The procedure of Examples 1–6 are repeated except for the difference that the vinyl monomer content of the paint binder solution is a mixture of styrene and methyl methacrylate and constitutes about 10 weight percent of said solution.

EXAMPLE 8

The procedure of Examples 1–6 are repeated except for the difference that the vinyl monomer content of the paint binder solution is a mixture of methyl methacrylate, butyl acrylate and 2-ethyl hexyl acrylate and constitutes about 60 weight percent of said solution.

EXAMPLE 9

The procedure of Examples 1–6 are repeated except for the difference that the vinyl monomer content of the paint binder solution is a mixture of ethyl acrylate, butyl methacrylate and octyl acrylate and constitutes about 25 weight percent of said solution.

EXAMPLE 10

The procedure of Examples 1–6 are repeated except for the difference that the vinyl monomer content of the paint binder solution is a mixture of styrene and vinyl toluene and constitutes about 50 weight percent of said solution.

EXAMPLE 11

The procedure of Examples 1–6 are repeated except that the alpha-beta olefinically unsaturated siloxane content is adjusted to constitute 30 weight percent of the paint binder solution and the alpha-beta olefinically unsaturated, vinyl monomer-comprising binder resin content is adjusted to constitute 70 weight percent of said binder solution exclusive of vinyl monomers.

EXAMPLE 12

The procedure of Examples 1–6 are repeated except that the alpha-beta olefinically unsaturated siloxane content is adjusted to constitute 70 weight percent of the paint binder solution and the alpha-beta olefinically unsaturated, vinyl monomer-comprising binder resin content is adjusted to constitute 30 weight percent of said binder solution exclusive of vinyl monomers.

EXAMPLE 13

The procedure of the preceding examples is repeated except that the alpha-beta olefinically unsaturated siloxane is prepared from the following components in the following manner:

| Reactants: | Parts by weight |
| --- | --- |
| Hydroxy functional cyclic siloxane [1] | 200 |
| Hydroxy ethyl methacrylate | 71 |
| Hydroquinone | 0.1 |
| Xylene, solvent | 116 |

[1] A commercially available hydroxy functional, cyclic polysiloxane having the following typical properties:

| Hydroxy content, Dean Stark: | |
| --- | --- |
| Percent condensible | 5.5 |
| Percent free | 0.5 |
| Average molecular weight | 1600 |
| Combining weight | 400 |
| Refractive index | 1.531 to 1.539 |
| Softening point, Durran's: | |
| Mercury method, degrees F. | 200 |

At 60% solids in xylene

| | |
| --- | --- |
| Specific gravity at 77° F. | 1.075 |
| Viscosity at 77° F., centipoises | 33 |
| Gardner-Holdt | A–1 |

Procedure

A three neck flask fitted with a stirring meter, a thermometer, a nitrogen inlet and a Barrett trap is charged with the siloxane, the methacrylate, the xylene and the hydroquinone. This solution is heated to reflux, 138° C., over a 30 minute period. Nitrogen is bubbled into the reaction throughout the whole procedure. By-product water is slowly removed and the temperature gradually rises to 146° C. After 5 hours, 8.5 ml. of water is collected indicating nearly complete reaction. The xylene is removed by reduced pressure distillation and the product is then diluted to 70 percent non-volatile content with methyl methacrylate.

EXAMPLE 14

The procedure of Example 1 is repeated except that the polysiloxane employed to produce the alpha-beta olefinically unsaturated siloxane is a methoxylated partial hydrolysate of monophenyl and phenylmethyl silanes consisting essentially of dimethyltriphenyltrimethoxytrisiloxane and has the following typical properties:

| | |
| --- | --- |
| Average molecular weight | 470 |
| Combining weight | 155 |
| Specific gravity at 77° F. | 1.105 |
| Viscosity at 77° F., centistokes | 13 |

EXAMPLE 15

The procedure of Example 1 is repeated except that the polysiloxane employed to produce the alpha-beta olefinically unsaturated siloxane is dipropoxytetramethylcyclotrisiloxane.

EXAMPLE 16

The procedure of Example 1 is repeated except that the polysiloxane employed to produce the alpha-beta olefinically unsaturated siloxane is dibutoxytetramethyldisiloxane.

EXAMPLE 17

The procedure of Example 1 is repeated except that the polysiloxane employed to produce the alpha-beta olefinically unsaturated siloxane is pentamethyltrimethoxytrisiloxane.

EXAMPLE 18

The procedures of Examples 1, 13 and 14 are repeated except that an equivalent amount of 2-hydroxyethyl acrylate is substituted for the hydroxyethyl methacrylate in preparing the siloxane-unsaturated ester product.

EXAMPLE 19

The procedure of Examples 1, 13 and 14 are repeated except that an equivalent amount of 2-hydroxypropyl methacrylate is substituted for the hydroxyethyl methacrylate in preparing the siloxane-unsaturated ester product.

EXAMPLE 20

The procedures of Examples 1, 13 and 14 are repeated except that an equivalent amount of 2-hydroxybutyl acrylate is substituted for the hydroxyethyl methacrylate in preparing the siloxane-unsaturated ester product.

EXAMPLE 21

The procedures of Examples 1, 13 and 14 are repeated except that an equivalent amount of 2-hydroxyoctyl acrylate is substituted for the hydroxyethyl methacrylate in preparing the siloxane-unsaturated ester product.

EXAMPLE 22

The procedures of Examples 1, 13 and 14 are repeated except that an equivalent amount of 2-hydroxydodecanyl methacrylate is substituted for the hydroxyethyl methacrylate in preparing the siloxane-unsaturated ester product.

EXAMPLE 23

The procedures of Examples 1, 13 and 14 are repeated except that an equivalent amount of 3-chloro-2-hydroxypropyl acrylate is substituted for the hydroxyethyl methacrylate in preparing the siloxane-unsaturated ester product.

EXAMPLE 24

The procedures of Examples 1, 13 and 14 are repeated except that an equivalent amount of 3-acryloxy-2-hydroxypropyl methacrylate is substituted for the hydroxyethyl methacrylate in preparing the siloxane-unsaturated ester product.

EXAMPLE 25

The procedures of Examples 1, 13 and 14 are repeated except that an equivalent amount of 3-crotonoxy-2-hydroxypropyl acrylate is substituted for the hydroxyethyl methacrylate in preparing the siloxane-unsaturated ester product.

EXAMPLE 26

The procedures of Examples 1, 13 and 14 are repeated except that an equivalent amount of 3-acryloxy-2-hydroxypropyl cinnamate is substituted for the hydroxyethyl methacrylate in preparing the siloxane-unsaturated ester product.

EXAMPLE 27

The procedures of Examples 1, 13 and 14 are repeated except that an equivalent amount of 3-acryloxy-2-hydroxypropyl crotonate is substituted for the hydroxyethyl methacrylate in preparing the siloxane-unsaturated ester product.

EXAMPLE 28

The procedures of Examples 18–27 are repeated using an amount of the monohydroxy ester of an alpha-beta olefinically unsaturated monocarboxylic acid that is sufficient to react with at least one hydroxy or hydrocarbonoxy functional group of such siloxane but insufficient to react with all of the functional groups of the siloxane molecules in the reaction mixture.

EXAMPLE 29

The procedures of Examples 18–27 are repeated using an amount of the monohydroxy ester of an alpha-beta olefinically unsaturated monocarboxylic acid that is in excess of the amount required to satisfy all of the hydroxy and hydrocarbonoxy functional groups of the siloxane molecules in the reaction mixture.

EXAMPLE 30

A pigmented paint is prepared by premixing 75 parts by weight of the siloxane-unsaturated ester product of Example 13 with 150 parts by weight of commercial grade titanium dioxide pigment and 20 parts by weight of methyl methacrylate. The mixture is ground by shaking with an equal amount of glass beads in a conventional paint shaker for 30 minutes. The premix is diluted with an additional 75 parts by weight of the siloxane-unsaturated ester product and 65 parts by weight of the resultant mix are diluted with 35 parts by weight of an equimolar mixture of styrene and methyl methacrylate. This mix is added to 35 parts methyl methacrylate and 65 parts by weight of the acrylic resin of Example 1. The paint is applied to metal, wood and polymeric (ABS acrylonitrile-butadiene-styrene copolymer) substrates to an average depth of about 1.5 mils and cured thereon with an electron beam in the manner of the previous examples.

EXAMPLE 31

The procedure of Example 1 is repeated except that curing is effected with the beam potential of 175,000 volts with the workpiece 3 inches from the emitter and at 400,000 volts at 10 inches each being in a nitrogen atmosphere containing minor amounts of carbon dioxide.

EXAMPLE 32

The procedures of Examples 1, 13 and 14 are repeated except that the alpha-beta olefinically unsaturated copolymer and the alpha-beta olefinically unsaturated siloxane are employed in the absence of vinyl monomers by reducing the viscosity to spraying consistency with toluene which is flashed off prior to curing.

EXAMPLE 33

Paints are prepared by admixing 160 parts by weight of the siloxane-unsaturated ester product of Example 1 and 160 parts by weight of the vinyl copolymer of Example 1, dividing this mix into two equal parts, and diluting one such part with 100 parts by weight methacrylate and the other part with 200 parts by weight methyl methacrylate. The resultant film-forming solutions are applied to metal substrates and crosslinked thereon with an electron beam in the manner of the preceding examples.

EXAMPLE 34

Paints are prepared by admixing 40 parts by weight of the siloxane-unsaturated ester product of Example 13 and 40 parts by weight of the vinyl copolymer of Example 2, dividing this mix into equal parts, and diluting one such part with 10 parts by weight methyl methacrylate and the other part with 20 parts by weight methyl methacrylate. The resultant film-forming solutions are applied to metal substrates and crosslinked thereon with an electron beam in the manner of the preceding examples.

The term "copolymer of vinyl monomers" is herein defined to mean a polymer wherein a major amount (above 50 wt. percent) of the constituent monomers therein are selected from two or more vinyl monomers.

It will be understood by those skilled in the art that modifications can be made within the foregoing examples within the scope of the invention as hereinafter claimed.

What is claimed is:

1. An article of manufacture comprising in combination a substrate and a coating adhered thereto and comprising the polymerization product of a film-forming dispersion crosslinked in situ by ionizing radiation, said film-forming dispersion on a pigment and particulate filler-free basis consisting essentially of (1) an alpha-beta olefinically unsaturated siloxane containing about 3 to about 18 silicon atoms per molecule and having at least two functional groups selected from hydroxy groups and hydrocarbonoxy groups with a monohydroxy alkyl ester of an alpha-beta olefinically unsaturated monocarboxylic acid, and (2) an alpha-beta olefinically unsaturated copolymer of vinyl monomers having molecular weight in the range of about 1,000 to about 50,000 and about 0.5 to about 5 units of alpha-beta olefinic unsaturation per 1,000 units molecular weight.

2. An article of manufacture comprising in combination a substrate and a coating adhered thereto and comprising the polymerization product of a film-forming dispersion crosslinked in situ by ionizing radiation, said film-forming dispersion on a pigment and particulate filler-free basis consisting essentially of (1) and about 20 to about 80 parts by weight of an alpha-beta olefinically unsaturated siloxane formed by reacting a siloxane having at least two functional groups selected from hydroxyl groups and $C_1$-$C_4$ alkoxy groups with a monohydroxy alkyl ester of an alpha-beta olefinically unsaturated monocarboxylic acid, and (2) about 80 to about 20 parts by weight of an alpha-beta olefinically unsaturated copolymer of vinyl monomers having molecular weight in the range of about 1,000 to about 25,000 and about 0.5 to about 3.5 units of alpha-beta olefinic unsaturation per 1,000 units molecular weight.

3. An article of manufacture in accordance with claim 2 wherein said monohydroxy ester is an acrylate or methacrylate.

4. An article of manufacture in accordance with claim 2 wherein said monohydroxy ester is a cinnamate.

5. An article of manufacture in accordance with claim 2 wherein said monohydroxy ester is a crotonate.

6. An article of manufacture in accordance with claim 2 wherein said siloxane contains about 3 to about 12 silicon atoms.

7. An article of manufacture comprising in combination of substrate and a coating having average depth in the range of about 0.1 to about 4 mils adhered thereto and comprising the polymerization product of a film-forming dispersion crosslinked in situ by ionizing radiation, said film-forming dispersion on a pigment and particulate filler-free basis consisting essentially of (1) about 10 to about 200 parts by weight vinyl monomers, (2) about 20 to about 80 parts by weight of an alpha-beta olefinically unsaturated siloxane formed by reacting a siloxane containing about 3 to about 18 silicon atoms per molecule and having at least two functional groups selected from hydroxy and $C_1$-$C_4$ alkoxy groups with a monohydroxy alkyl ester of an alpha-beta olefinically unsaturated monocarboxylic acid, and (3) about 20 to about 80 parts by weight of an alpha-beta olefinically unsaturated copolymer of vinyl monomers having molecular weight in the range of about 1,000 to about 25,000 and about 0.5 to about 5 units of alpha-beta olefinic unsaturation per 1,000 units molecular weight.

8. An articles of manufacture in accordance with claim 7 wherein said copolymer of vinyl monomers has molecular weight in the range of about 3,000 to about 10,000 and between about 0.5 and about 3.5 units of alpha-beta olefinic unsaturation per 1,000 units molecular weight.

9. An article of manufacture comprising in combination a substrate and a coating having average depth in the range of about 0.1 to about 4 mils adhered thereto and comprising the polymerization product of a film-forming dispersion crosslinked in situ by ionizing radiation, said film-forming dispersion on a pigment and particulate filler-free basis consisting essentially of (1) about 10 to about 200 parts by weight vinyl monomers at least a major proportion of which are selected from esters of acrylic or methacrylic acid and a $C_1$–$C_8$ monohydric alcohol and $C_8$–$C_9$ monovinyl hydrocarbons, (2) about 30 to about 70 weight percent of an alpha-beta olefinically unsaturated siloxane formed by reacting a siloxane containing about 3 to about 18 silicon atoms per molecule and having at least two functional groups selected from hydroxy groups and methoxy groups with a monohydroxy ester of acrylic or methacrylic acid selected from hydroxyethyl acrylate, hydroxyethyl methacrylate, hydroxypropyl acrylate, and hydroxypropyl methacrylate, the remaining valences of said silicon atoms being satisfied with hydrocarbon radical, oxygen, hydrocarbonoxy radical, hydrogen or hydroxyl, and (3) about 30 to about 70 parts by weight of an alpha-beta olefinically unsaturated copolymer of vinyl monomers having molecular weight in the range of about 1,000 to about 25,000 and between 0.5 and 3.5 units of alpha-beta olefinic unsaturation per 1,000 units molecular weight.

References Cited

UNITED STATES PATENTS

| | | | |
|---|---|---|---|
| 3,437,512 | 4/1969 | Bunlant et al. | 117—93.31 |
| 3,488,304 | 11/1970 | Baugh et al. | 260—22 |

ALFRED L. LEAVITT, Primary Examiner

E. G. WHITBY, Assistant Examiner

U.S. Cl. X.R.

117—127, 132, 138,8, 147, 161; 260—41, 827